(12) United States Patent
Galewski et al.

(10) Patent No.: US 7,268,206 B2
(45) Date of Patent: Sep. 11, 2007

(54) PROCESS AND APPARATUS FOR DEGASSING A POLYMER

(75) Inventors: Jean-Marc Galewski, Noeux les mines (FR); Hugues Goujon, Istres (FR); Nathalie Ville, Lille (FR)

(73) Assignee: Ineos Europe Limited, Hampshire (GB)

( * ) Notice: Subject to any disclaimer, the term of this patent is extended or adjusted under 35 U.S.C. 154(b) by 178 days.

(21) Appl. No.: 10/525,731

(22) PCT Filed: Aug. 14, 2003

(86) PCT No.: PCT/GB03/03583

§ 371 (c)(1), (2), (4) Date: Feb. 28, 2005

(87) PCT Pub. No.: WO2004/020482

PCT Pub. Date: Mar. 11, 2004

(65) Prior Publication Data

US 2005/0240003 A1 Oct. 27, 2005

(30) Foreign Application Priority Data

Aug. 30, 2002 (FR) .................................. 02 10778

(51) Int. Cl.
*C08F 6/00* (2006.01)
(52) U.S. Cl. .................. 528/480; 159/2.1; 159/2.3; 422/131; 422/196; 528/501
(58) Field of Classification Search ............... 159/2.1, 159/2.3; 422/131, 196; 528/480, 501

See application file for complete search history.

(56) References Cited

U.S. PATENT DOCUMENTS 3,644,296 A  2/1972 Bosch (Continued)

FOREIGN PATENT DOCUMENTS

| EP | 0 905 149 A1 | 3/1999 |
|---|---|---|
| EP | 1 084 739 A2 | 3/2001 |

*Primary Examiner*—Terressa Boykin
(74) *Attorney, Agent, or Firm*—Finnegan, Henderson, Farabow, Garrett and Dunner, L.L.P.

(57) ABSTRACT

The present invention relates to a process for stripping residual volatile compounds contained in a thermoplastic polymer. The process comprises (1) forming the polymer in the form of a melt flowing as a main stream, (2) forming a foaming agent in the form of one or more secondary liquid streams, (3) adding the secondary stream(s) to the main stream by spraying so as to divide each secondary liquid stream into several fractional streams and thus to form a polymer melt/foaming agent pre-mixture, (4) introducing the pre-mixture into a static mixer, then into an expansion chamber at reduced pressure so as to separate the polymer melt from the residual volatile compounds and from the foaming agent, and (5) withdrawing the polymer melt from the expansion chamber. The invention also relates to an apparatus for removing residual volatile compounds contained in a thermoplastic polymer. The apparatus comprises (i) a polymer melt feed line, (ii) an addition chamber into which the feed line runs and through which the polymer flows as a main stream, (iii) one or more lines for adding a foaming agent as one or more secondary liquid stream(s), which lines run into the addition chamber and have at their ends a spray device allowing each secondary liquid stream to be divided into several fractional streams, (iv) a static mixer having an inlet, connected to the addition chamber, and an outlet, and (v) an expansion chamber for separating the polymer melt from the residual volatile compounds and from the foaming agent, which chamber is connected to the outlet of the static mixer and is provided with a line for withdrawing the polymer melt and with a line for extracting the residual volatile compounds and the foaming agent.

30 Claims, 5 Drawing Sheets

U.S. PATENT DOCUMENTS

| | | |
|---|---|---|
| 3,668,161 A | 6/1972 | Nauman et al. |
| 3,853,672 A | 12/1974 | Gordon et al. |
| 3,928,300 A | 12/1975 | Hagberg |
| 4,195,169 A | 3/1980 | Priddy |
| 4,233,269 A | 11/1980 | Kaye et al. |
| 4,294,652 A | 10/1981 | Newman |
| 4,383,972 A | 5/1983 | McCurdy et al. |
| 4,537,954 A | 8/1985 | Ando et al. |
| 5,350,813 A | 9/1994 | Skilbeck |
| 5,380,822 A | 1/1995 | Skilbeck |
| 5,453,158 A | 9/1995 | Cummings et al. |
| 5,540,813 A | 7/1996 | Sosa et al. |
| 5,691,445 A | 11/1997 | Krupinski et al. |
| 5,861,474 A | 1/1999 | Weller et al. |
| 5,874,525 A | 2/1999 | Krupinski et al. |
| 6,124,426 A * | 9/2000 | Sugimoto et al. ........... 528/480 |
| 6,410,683 B1 | 6/2002 | Craig |
| 6,419,386 B1 | 7/2002 | Fleischli et al. |

* cited by examiner

PROCESS AND APPARATUS FOR DEGASSING A POLYMER

The present invention relates to a process and to an apparatus for degassing a polymer, especially in order to remove residual volatile compounds contained in a thermoplastic polymer.

In a process for manufacturing a polymer, the polymerisation reaction should in theory be complete and convert all of the monomer into polymer. In reality, it is known that a polymerisation reaction is never complete, in particular in a solution or bulk polymerisation process, especially because of the increase in the viscosity of the polymerisation medium during the reaction. Thus, in practice, the polymer obtained contains in general residual volatile compounds, such as any monomer that has not reacted, one or more solvents that have been added or have built up during the reaction, and oligomers formed during the reaction. These products are essentially volatile compounds compared with the polymer, which is not volatile. Furthermore, it is known that these residual volatile compounds have undesirable effects on the quality of the polymer, such as for example the physical and mechanical properties and the toxicological characteristics of the polymer, especially in food packaging applications.

There has long been a need to develop higher-performance and more effective processes for removing the residual volatile compounds contained in polymers, especially because of the ever stricter toxicological regulations. These processes generally consist of a polymer degassing operation called "devolatilisation". The degassing is generally carried out by subjecting the hot polymer, in particular in the form of a solution or of a melt, to a reduced pressure, preferably a pressure below atmospheric pressure (or subatmospheric pressure) in one or more expansion chambers, (also called "flash tanks" or "devolatilisers"), that are placed in series and are under successively higher vacuum levels. In particular, the polymer may be extruded into an expansion chamber in the form of a melt and divided, for example in the form of "falling strands" so as to facilitate the separation of the residual volatile compounds from the polymer, which is thus recovered, stripped of these compounds. Such degassing processes are described, for example, in U.S. Pat. No. 2,970,089, U.S. Pat. No. 3,853,672, U.S. Pat. No. 3,928,300, U.S. Pat. No. 4,294,652, U.S. Pat. No. 4,383,972, U.S. Pat. No. 5,453,158, U.S. Pat. No. 5,540,813 and U.S. Pat. No. 5,874,525.

It is known that improvements have been made over many years in such degassing processes, especially by the addition of an inert and volatile agent to the polymer. This agent is generally known by the term "foaming agent", "blowing agent" or "stripping agent", or else a "devolatilisation-assisting fluid" or "devolatilisation aid". Under these conditions, degassing the polymer generally consists in expanding the mixture resulting from this addition, when hot and at a reduced pressure, in an expansion chamber such as those described above. It follows from this expansion that the foaming agent forms a large number of bubbles within the polymer melt and that the stripping of the residual volatile compounds contained in the polymer, by diffusion, is facilitated by the considerably increased surface area of the foaming mass that results. The foaming agents most often used are those described in U.S. Pat. No. 3,668,161, U.S. Pat. No. 3,773,740, U.S. Pat. No. 4,195,169, U.S. Pat. No. 4,537,954, U.S. Pat. No. 5,350,813, U.S. Pat. No. 5,380,822 and U.S. Pat. No. 6,410,683. These are generally liquid fluids under normal conditions and readily volatile under the degassing conditions, for example water, alcohols or ketones, or a solution of carbon dioxide in water. U.S. Pat. No. 5,691,445 and U.S. Pat. No. 5,861,474 have proposed to replace these conventional foaming agents with a supercritical fluid which would normally be gaseous under the injection conditions, but which is kept in solution in the polymer thanks to high pressures being applied during the injection. Thus, it has been proposed, for example, to use nitrogen, carbon dioxide and alkanes, especially $C_4$ to $C_6$ alkanes.

In all cases, few details have been given about the way in which the foaming agent is added to the polymer, except for the fact that it is generally recommended to make the addition and then to subject the resulting mixture to a static mixer placed downstream of the expansion chamber. In general, it is believed that the static mixer has the effect of dispersing the foaming agent throughout the polymer mass. However, little has been described about the way in which the foaming agent in fact is mixed into and dispersed within the polymer mass. The relatively high temperature and the high pressure that are applied in the process before the degassing, and the vacuum and high temperature that are applied during the degassing in the expansion chamber generally prevent direct observations being made on the mixture and on the dispersion of the foaming agent in the polymer, the dividing of the foaming agent into relatively fine liquid particles (or droplets) within the polymer and the pre-expansion of the polymer, for example in the static mixer.

U.S. Pat. No. 6,124,426 (equivalent to European Patent Application EP 905 149 A) proposes the injection of a foaming agent, such as water, an alcohol or a ketone, into a polymer melt using a nozzle directed in the opposite direction to the flow of the polymer, this having the effect of improving the mixing performance of a static mixer placed downstream of the point of addition of the foaming agent. An injection nozzle is generally defined as being a line that includes a restriction so as to accelerate and direct a fluid, the pressure of which drops on leaving the nozzle. In the United States patent, it is specified that a nozzle oriented in the opposite direction, that is to say in the direction of flow of the polymer, tends to concentrate the foaming agent at one point in the static mixer and that this results in non-uniform mixing, a reduction in the performance of the mixer and finally less effective degassing of the polymer.

European Patent Application EP 1 084 739 discloses an apparatus and a process for the devolatilisation of polymers, in particular for the removal of volatile impurities from thermoplastic polymers. The process comprises charging a stripping agent into a molten polymer at an inlet end of a static mixer means via a pump and an injection device. However, the European Patent Application is silent about the injection device and how the stripping agent is charged into the molten polymer.

U.S. Pat. No. 3,644,296 discloses a process for the high molecular weight polymerisation of lactams. The process comprises (i) mixing a first portion of lactam monomers with a catalyst to provide a first component, (ii) mixing a second portion of lactam monomers with a polymerisation accelerating promoter to provide a second component, (iii) mixing the first and second components together in a liquid state, and (iv) introducing the resulting mixture into a polymerisation zone. However, the United States Patent discloses neither a process, nor an apparatus for degassing a polymer and more particularly for removing residual volatile compounds contained in a polymer after a polymerisation. It does not disclose the addition of a foaming agent to a melted polymer.

U.S. Pat. No. 4,233,269 discloses a fluid flow distributor for mixing and distributing gas and liquid over the cross-section of a reactor vessel having an upward fluid flow path. In the reactor vessel, gases and liquids are contacted in order for a desired chemical reaction to proceed, e.g. in operations for hydrofininig of oils, hydrocracking of hydrocarbons into lighter compounds, hydrogenation of olefins and aromatics and oxonation of olefins to aldehydes. However, the United States Patent describes neither a process, nor an apparatus for degassing a polymer. In particular, it does not describe the addition of a liquid to another liquid. Furthermore, it discloses neither a static mixer, nor an expansion chamber at reduced pressure for separating a polymer melt from residual volatile compounds.

U.S. Pat. No. 6,419,386 proposes a static mixing apparatus comprising two laminar static mixers, placed in series, having a cross section that increases in size in the direction of flow of a high-viscosity main product intended to be mixed with a low-viscosity additive. The apparatus furthermore includes a device for injecting the additive into the main product. The device comprises a plate having a convergent orifice through which the main product and the additive pass, which orifice is placed before or at the inlet of the first of the two static mixers. It also includes a line for injecting the additive (provided at its end with a nozzle) aligned with the orifice and oriented in the direction of flow of the main product. The nozzle comprises a central feed channel which emerges on the axis of the orifice in the plate. It is specified that the proposed apparatus is suitable for mixing a viscous product, such as a polystyrene, with a much less viscous additive, such as a mineral oil or a paraffin oil, soluble in polystyrene. The additive may, in other cases, be a gas such as nitrogen, carbon dioxide or steam. However, it is not mentioned whether the apparatus, and especially the injection device, may be suitable for adding a foaming agent to a polymer, and mixing it thereinto, during a degassing operation.

However, it has been attempted to use the injection device described in U.S. Pat. No. 6,419,386, for the purpose of adding a foaming agent, such as water, into a molten polymer manufactured continuously in a bulk polymerisation process, such as a polystyrene, at the inlet of a static mixer placed upstream of an expansion chamber for degassing the polymer. "Pounding" or "hammering" phenomena are then observed, which are accompanied by substantial vibration in the mixer, with repercussions in the expansion chamber. The magnitude of these phenomena was such that the plant could have been damaged and its safety put into jeopardy. These phenomena appear especially during changes in the manufacture of the polystyrene, for example a reduction in the hourly production rate and/or a decrease in the average molecular mass of the polymer. After extensive research, it has been found that these pounding phenomena could be due to "cavitation" phenomena occurring in the mass of the polymer melt flowing through the static mixer. Such phenomena could be caused by the water injected into and poorly dispersed within the polymer. In particular, lowering the pressure to below the vapour pressure of the water could lead to sudden vaporization of the water and the formation of large pockets of water vapour. These gas pockets are characterized by instability owing to the fact that, subsequently, the slightest variations in temperature and pressure could lead to the wvater suddenly recondensing.

The object of the present invention is specifically to correct these shortcomings and allow more effective degassing of polymers, especially when conventional foaming agents are used, in particular liquid fluids that are readily volatile and generally insoluble in these polymers. One of the advantages of conventional foaming agents derives from the fact that they are injected in liquid form and that the small amounts introduced are easier to control.

The present invention firstly relates to a process for stripping residual volatile compounds contained in a thermoplastic polymer, characterized in that it comprises the following steps:

(1) forming the polymer in the form of a melt flowing as a main stream;

(2) forming a foaming agent in the form of one or more secondary liquid streams;

(3) adding the secondary liquid stream(s) to the main stream by spraying so as to divide each secondary liquid stream into several fractional streams and thus to form a polymer melt/foaming agent pre-mixture;

(4) introducing the pre-mixture into a static mixer, then into an expansion chamber at reduced pressure so as to separate the polymer melt from the residual volatile compounds and from the foaming agent; and withdrawing the polymer melt, thus stripped of the residual volatile compounds and of the foaming agent, from the expansion chamber.

FIG. 1 shows schematically an apparatus for degassing a thermoplastic polymer, allowing the process of the invention to be implemented.

FIGS. 2, 3 and 4 show schematically several embodiments of a spray device that can be installed in the apparatus shown in FIG. 1.

FIG. 5 shows schematically a spray nozzle that can be used in the devices shown in FIGS. 2, 3 and 4.

The thermoplastic polymer used in the process of the invention may be a thermoplastic homo- or co-polymer, or a blend of two or more thermoplastic (co-)polymers, especially chosen from olefin polymers, especially poly(alpha-olefins) such as a low-density polyethylene (LDPE), a high-density polyethylene (HDPE), a linear low-density polyethylene (LLDPE), a co-polymer of ethylene with at least one alpha-olefin, for example a $C_3$ to $C_8$ alpha-olefin, a polypropylene, a polybutene, a polyisobutene, or a blend of a polyethylene with a poly(alpha-olefin). The thermoplastic (co-)polymers may also be chosen from vinyl polymers, especially aromatic vinyl polymers, such as a polystyrene, a poly(alpha-methylstyrene), a high-impact polystyrene (HIPS), in particular one modified by grafting on a natural or synthetic rubber, such as a polybutadiene or a polyisoprene, a styrene/acrylonitrile co-polymer (SAN), a styrene/maleic anhydride co-polymer (SMA), an acrylonitrile/butadiene/styrene ter-polymer (ABS), a styrene/acrylic acid co-polymer, a styrene/methyl methacrylate co-polymer, and a polyvinyl chloride. The thermoplastic (co-)polymers may also be chosen from polycarbonates, polyamides, polyesters, polysiloxanes and synthetic rubbers, such as a polybutadiene, a polyisoprene, an ethylene-propylene rubber (EPR) and an ethylene-propylene-diene rubber (EPDM). It is preferable to choose a thermoplastic (co-)polymer from olefin polymers and vinyl aromatic polymers, such as those mentioned above, and especially from styrene (co-)polymers, such as polystyrene and high-impact polystyrene (HIPS). In the present description, the term "polymer" means both a homo-polymer or co-polymer and a blend of two or more (co-)polymers.

In the process of the invention, the residual volatile compounds contained in the polymers may in general be one or more residual monomers, one or more organic solvents that have been added or built up during the manufacture of the polymers, especially aliphatic hydrocarbons, such as hexane, heptane, octane or decane, aromatic hydrocarbons, such as benzene, toluene, ethylbenzene, xylene, cumene or other alkyl benzenes, halogenated hydrocarbons, halogenated aromatic hydrocarbons, nitrile compounds, amine compounds and also oligomers produced during the manufacture of the polymers. In particular, the residual volatile compounds found at the end of the manufacture of styrene polymers are essentially residual styrene, hydrocarbon impurities generally accompanying the monomer, related to inert solvents having a low boiling point, such as ethylbenzene, cumene, n-propylbenzene, methylcyclohexanie and ethyltoluene, and styrene oligoniers, such as styrene dimer-s and trimers. These residual volatile compounds are found in the polymers after polymerisation. In general, the residual monomer content, for example the residual styrene content, may be around 0.5 to 25%, preferably 1 to 10%, by weight with respect to the polymer.

A preliminary degassing step may be carried out on the polymer by subjecting the polymer melt to reduced pressure, so as to remove a substantial portion of the residual volatile compounds before the process of the invention is carried out. The polymer resulting from this preliminary step may have a residual monomer, for example residual styrene, content of around 500 to 5000, preferably 1000 to 3000, parts by weight per million (ppm) with respect to the polymer.

The process of the invention comprises a step in which the polymer containing the residual volatile compounds, as described above, is formed as a melt. In general, the polymer is heated to a temperature above the glass transition temperature $T_g$ (measured according to the ASTM E 1356-98 method) of the polymer and preferably below the decomposition temperature of the polymer. The polymer may be heated toga sufficiently high temperature, and well above the $T_g$ of the polymer, for the viscosity of the polymer not to be too high, for the polymer to be able to flow relatively easily and for degassing to be facilitated. Thus, the polymer may be heated to a temperature greater than $(T_g+30°\ C.)$, preferably greater than $(T_g+50°\ C.)$, especially greater than $(T_g+90°\ C.)$. The polymer melt may result from melting the polymer, for example in an extruder. Preferably, it may result directly from the manufacture of the polymer, when the polymer is manufactured especially using a solution, or preferably bulk, polymerisation process. Thus, when a styrene polymer is manufactured using a bulk polymerisation process, the polymer is generally obtained, after polymerisation, in the form of a melt at a temperature ranging from 130 to 200° C., preferably 150 to 190° C. The polymer melt is then preferably preheated to a suitable temperature for degassing the polymer, for example a temperature ranging from 180 to 300° C., preferably 200 to 280° C., especially 220 to 260° C. The preheating may be carried out in a heat exchanger, for example of the static mixer type. Furthermore, it is preferable to subject the polymer melt to a prior degassing operation in an expansion chamber, at a temperature that may range from 180 to 300° C., preferably 200 to 280° C., especially 220 to 260° C., and at a reduced pressure, for example a pressure below atmospheric pressure, preferably an absolute pressure ranging from $5\times10^2$ to $5\times10^4$ Pa, especially $10^3$ to $10^4$ Pa. In general, the purpose of the prior degassing operation is essentially to separate a substantial portion of the residual volatile compounds from the polymer, before the degassing according to the invention which is carried out using a foaming agent, thus making it possible to optimise the removal of the residual volatile compounds until a polymer with very low contents of these compounds is obtained.

The polymer melt is employed in the process of the invention in the form of a main stream, preferably continuously, for example using a gear pump.

The process of the invenition also comprises a step in which a foaming agent is formed in the form of at least one secondary liquid stream. The foaming agent may preferably be chosen from fluids that are liquid under normal conditions and are also readily volatile, especially under the degassing conditions, in particular the reduced-pressure expansion conditions. Furthermore, the foaming agent may be insoluble (or immiscible) or substantially insoluble in the polymer melt. The foaming agent may be chosen from water, alcohols, especially $C_1$ to $C_{10}$, preferably $C_1$ to $C_5$, alcohols, ketones, especially $C_3$ to $C_{10}$, preferably $C_3$ to $C_5$, ketones, an aqueous carbon dioxide solution, and mixtures of two or more of these products. Preferably, the foaming agent is chosen from water, methanol, ethanol, n-propanol, isopropanol, n-butanol, isobutanol, acetone, a 0.1 to 10 wt %, preferably 0.5 to 5 wt %, especially 0.5 to 1.5 wt %, carbon dioxide solution, (based on the total weight of the solution) and a mixture of two or more of these products. The amount of foaming agent added to the polymer may be 0.1 to 8%, preferably 0.2 to 5%, especially 0.5 to 3% by weight with respect to the polymer.

The foaming agent is employed in the process of the invention in the form of one or more secondary liquid streams, preferably continuously, using for example one or more pumps.

The process of the invention also includes a step in which the secondary liquid stream(s) is(are) added, preferably continuously, to the main stream by spraying so as to divide each secondary liquid stream into several fractional streams. The expression "spraying of the secondary liquid stream" is understood to mean in general any means for dividing or fragmenting the secondary liquid stream into several fractional streams, especially into at least two, or preferably at least three, or especially at least four fractional streams, for example into a number of fractional streams ranging from 2 to 20, preferably 3 to 15, especially 4 to 12. This division or fragmentation into several fractional streams allows the above-mentioned "pounding" phenomena to be reduced or even eliminated, and at the same time allows the effectiveness of the degassing process to be very considerably improved. One of the observed improvements in the process may, for example, be such that it is possible to reduce the degassing temperature and/or to reduce the vacuum (that is to say-increase the sub-atmospheric pressure) in the expansion chamber, whilst continuing to remove a constant amount of volatile compounds. Alternatively, the content of residual volatile compounds in the polymer may be substantially reduced, especially compared with the known prior processes. Another observed improvement may also be such that it is possible to reduce the amount of foaming agent used in the degassing, whilst still continuing to remove a constant amount of residual volatile compounds. Such a reduction in the amount of foaming agent makes it easier to carry out the subsequent operations of separating, condensing and recovering the residual volatile compounds and in particular the residual monomer. The residual monomer thus recovered may advantageously be returned to the polymerisation in order to manufacture polymer. To give an example, very substantial cost reductions relating to the heating, cooling and/or energy means employed in these separation, condensation and recovery operations may be achieved.

The spraying of the secondary liquid stream into the main stream is carried out in such a way that the secondary liquid stream is divided into several fractional streams, or more particularly into several liquid jets that can thus penetrate the main stream and can then themselves be reduced or subdivided more easily into small liquid particles or droplets. The spraying is preferably carried out so as to orient the fractional streams in a direction at right angles to the direction of the main stream or at a right, acute or zero angle thereto, preferably an acute angle or zero angle, that is to say in a direction having a non-zero component directed along the direction of the main stream. In particular, at least one of the fractional streams may be chosen to be oriented in a direction equivalent to the direction of the main stream or substantially in this direction, while at least one of the other fractional streams is oriented in a direction making an angle of greater than 20° and less than or equal to 90°, preferably an angle of greater than 20° and less than 90°, for example an angle ranging from 30° to 80°, especially 45° to 75°, with the direction of the said main stream. The expression "direction substantially in the direction of the main stream" may be understood to mean a direction making an angle of 20°, preferably ±10, with the direction of the said stream.

When the foaming agent is used in the form of two or more secondary liquid streams, the latter are preferably introduced simultaneously by spraying them into the main stream and especially in one of the preferred forms described above.

Such spraying makes it possible to form a pre-mixture in which the polymer melt is pre-mixed with the foaming agent thus divided or fragmented beforehand. This pre-mixture is especially produced before or just before the moment when it is introduced into a static mixer.

The temperature and the pressure of the secondary liquid stream(s) are in particular such that the foaming agent is in liquid form at the moment when it is added to the main stream. In particular, the secondary liquid stream(s) may be at a temperature equal to or preferably less than that of the main stream, for example at a temperature ranging from room temperature (for example 20° C.) up to 200° C., or preferably up to 150° C., and at a pressure greater than that of the main stream, for example 0.2 to 3 MPa, preferably 0.3 to 2 MPa, greater than that of the main stream.

At the point of addition of the secondary liquid stream(s) into the main stream, the main stream may be at the same or approximately the same temperature as that of the polymer melt, in particular at a temperature as indicated above, especially at the moment of preheating. At this point of addition, the main stream may be at an absolute pressure chosen within the range from 1 to 12 N4 Pa, preferably 1.5 to 10 MPa, especially 2 to 8 MPa.

According to a preferred version, it may be advantageous to add the secondary liquid stream(s) to the main stream at the moment when the latter is subjected to a constriction, or more particularly to a double operation comprising, in the direction of flow of the main stream, in succession a decompression phase followed by a compression phase. The constriction may be obtained by a restriction (or narrowing) of the main stream produced by, for example, an orifice plate or a "venturi" device. The constriction may comprise, in the direction of the main stream, in succession an upstream or convergent section followed by a downstream or divergent section, the narrowest part of the constriction being located between the convergent section and the divergent section, that is to say between the decompression phase and the compression phase. It has been found that the pre-mixing is substantially improved when the addition of the secondary liquid stream(s) is carried out during the constriction of the main stream, and more particularly during the decompression phase or during the compression phase, or else between these two phases. The best results were obtained when the addition is especially carried out between the decompression and compression phases, or preferably during the compression phase of the main stream. It has in fact been observed that such an addition has the effect of improving the spraying, especially the division of the foaming agent into fractional streams, and thereafter of making it easier to degas the polymer.

The constriction may be employed in such a way that, during the decompression phase, the main stream is subjected to a pressure drop ranging from 0.2 to 2 MPa, preferably 0.3 to 1.2 MPa, and that thereafter, during the compression phase, it is subjected to an increase in the pressure, the magnitude of the increase generally being less than that of the drop, in particular ranging from 0.1 to 1 MPa, preferably 0.1 to 0.5 MPa. The constriction of the main stream may thus cause an overall head loss ranging from 0.1 to 1 MPa, preferably 0.2 to 0.7 MPa.

When the constriction of the main stream is carried out by applying a convergent section and a divergent section respectively to the passage of the stream, it is not only advantageous to introduce the secondary liquid stream(s) between the decompression and compression phases, or preferably during the compression phase, of the main stream, but it is also furthermore particularly recommended to orient at least one of the fractional streams in a direction parallel or approximately parallel to the plane of the divergent section. The expression "direction approximately parallel to the plane of the divergent section" may be understood to mean a direction making an angle of ±20°, preferably ±10° or even ±5°, with the plane of the divergent section. Furthermore, it may be recommended for at least one of the other fractional streams to be simultaneously oriented in a direction equivalent to the direction of the main stream or substantially in this direction. The expression "direction substantially in the direction of the main stream" may be understood to mean a direction making an angle of ±20°, preferably ±10°, with the direction of the said stream.

Moreover, it has been found that forming the pre-mixture under the conditions of the invention then tends to facilitate the operations carried out in the static mixer and in the expansion chamber, so that the process of degassing the polymer is considerably improved overall.

Specifically, the process of the invention then comprises the introduction of the pre-mixture into a static mixer, the introduction preferably being carried out continuously. The static mixer may be a linear or conventional static mixer, for example a static mixer of the SMX type sold by Sulzer Chemtech or Koch Glitsch, or another conventional static mixer sold by Kenics, Toray or Ross. It is also possible to use a static mixer as described in Japanese Patent Applications JP 62-191274 or JP 57-15258, in British Patent Application GB 2 010 739 or in French Patent FR 2 223 073. It is also possible to use a static mixer as described in U.S. Pat. No. 6,419,386, particularly one suitable for mixing products of very different viscosity: in particular, it comprises two static mixers in line, each having a different cross section. However, the process of the invention has the advantage of being able to use a more conventional static mixer, such as one of those mentioned above.

The static mixer may operate under conditions such that the shear rate lies within a range from 1 to 200 sir, especially 1 to 1.0 $s^{-1}$. The temperature of the static mixer may be the same as that of the expansion chamber. In particular, it may be chosen within a range from 180 to 300° C., preferably 200 to 280° C., especially 210 to 260° C. or 220 to 245° C.

By virtue of the process of the invention, the temperature of the static mixer may advantageously be reduced, for example by at least 10 or 15° C., compared with that normally used during this step, without thereby affecting the homogenisation of the mixing and without restricting the dispersion of the foaming agent within the polymer. The pressure at the inlet of the static mixer may be chosen within a range from 1 to 12 MPa, preferably 1.5 to 10 MPa, especially 2 to 8 MPa. The pressure at the outlet of the static mixer may be the same, or approximately the same, as that in the expansion chamber. According to the process of the invention, the static mixer may essentially have the effect of homogenising the pre-mixture and of continuing to disperse and divide the foaming agent into extremely fine liquid particles or droplets in such a way that the mixing that results is optimised so as thereafter to be advantageously expanded and degassed. The mean residence time of the polymer melt and the foaming agent in the static mixer may range from 0.5 to 20 minutes, preferably 0.5 to 10 minutes, especially 1 to 5 minutes. Advantageously, it may be reduced compared with those known in the conventional polymer degassing processes.

The process of the invention then comprises the introduction of the mixture into an expansion chamber, this introduction preferably being carried out continuously. The expansion chamber may be one of those described in the polymer degassing processes. In particular, an expansion chamber may be used in which the mixture is extruded in the form of a divided mass, for example in the form of falling strands. The absolute pressure applied in the expansion chamber is preferably chosen in such a way that the mixture can be expanded by vaporizing the foaming agent. A sub-atmospheric pressure (that is to say a pressure below atmospheric pressure), which may be chosen within a range from $10^2$ to $10^4$ Pa, preferably $10^2$ to $5 \times 10^3$ Pa, especially $5 \times 10^2$ to $5 \times 10^3$ Pa, may especially be applied. The sub-atmospheric pressure applied in the expansion chamber may advantageously be greater, for example by a factor of at least 2, than that normally used during this step, without thereby impairing the effectiveness of the degassing. The temperature of the expansion chamber is preferably chosen in such a way that the mixture can be expanded and the polymer maintained in the melt, especially in a relatively fluid form, and without being substantially degraded or decomposed. The temperature may be chosen within a range from 180 to 300° C., preferably 200 to 280° C., especially 210 to 260° C. or 220 to 245° C. By virtue of the process of the invention, the temperature of the expansion chamber may be advantageously reduced, for example by at least 10 or 20° C., compared with that normally used during this step, without thereby impairing the effectiveness of the degassing. Such a reduction in temperature is furthermore particularly beneficial since it makes it possible to reduce the effects of any thermal de-polymerisation of the polymer and especially to reduce the residual monomer content in the polymer.

The expansion chamber thus allows the residual volatile compounds and the foaming agent to be separated from the polymer melt. In particular, the residual monomer content, for example residual styrene content, of the polymer degassed according to the invention may be equal to or less than 250 ppm, and preferably be in a range from 50 to 250 ppm, especially 50 to 200 ppm.

The polymer, thus substantially stripped of the residual volatile compounds and the foaming agent, is withdrawn from the expansion chamber, preferably continuously, especially by a gear pump.

The present invention also relates to an apparatus for removing residual volatile compounds contained in a thermoplastic polymer, especially by implementing the process described above, which apparatus is characterized in that it comprises:
  a polymer melt feed line;
  an addition chamber into which the feed line runs and through which the polymer melt flows as a main stream;
  one or more line(s) for the addition of a foaming agent flowing as one or more secondary liquid streams, which line(s) runs (run) into the addition chamber and has (have) at its (their) end(s) a spray device allowing each secondary liquid stream to be divided into several fractional streams;
  a static mixer having an inlet, connected to the addition chamber, and an outlet; and
  an expansion chamber for separating the polymer melt from the residual volatile compounds and from the foaming agent, which chamber is connected to the outlet of the static mixer and is provided with a line for withdrawing the polymer melt thus separated and with a line for extracting the residual volatile compounds and the foaming agent.

The apparatus according to the invention comprises an addition chamber into which a line for feeding the polymer melt containing especially the residual volatile compounds to be removed runs and through which the polymer melt flows as a main stream. Running into the addition chamber are one or more lines for the addition of a foaming agent flowing as one or more secondary liquid streams. The apparatus also comprises a static mixer having an inlet connected, in particular directly or indirectly, to the addition chamber and an outlet connected, in particular directly or indirectly, to an expansion chamber. The thermoplastic polymer and the foaming agent may especially be those described above.

The addition chamber may be of any form. In particular, it may be in the form of a line or pipe, in particular a line that extends the polymer melt feed line, or else a chamber contiguous with (or adjacent to) the inlet of the static mixer, and preferably placed on the longitudinal axis of the static mixer. The addition chamber may especially be designed to withstand the relatively high pressures and temperatures, such as those indicated above.

The addition line(s) run into the addition chamber and have, at their end, a spray device for dividing each secondary liquid stream into several fractional streams, especially so as to form in the addition chamber a pre-mixture of the polymer melt with the foaming agent thus pre-divided or pre-fragmented. Dividing the secondary liquid stream into several fractional streams was described in detail above. The spray device may be any system capable of mechanically dividing a liquid mass. In particular, it may be chosen from sprayers, atomizers, vaporizers or nebulization devices. It may especially consist of a closed nozzle, placed at the end of the addition line and pierced by several orifices, the number of which is equivalent to the number of fractional streams to be formied, in particular at least 2, preferably at least 3 or 4, per nozzle, for example a number ranging from 2 to 20, preferably 3 to 15, especially 4 to 12 per nozzle. The nozzle may have any shape and in particular be in the shape of a closed envelope pierced with orifices, having an open base, especially one contiguous with the end of the addition line. The nozzle may in particular have the shape of a cylindrical envelope, especially an envelope cylindrical of revolution, such as a hollow plug, one of the two bases of which is closed and the other base is open and especially contiguous with the end of the addition line, both the envelope and the closed base being pierced with orifices. The nozzle (or in particular its envelope) may have a wall such that each pierced orifice consists of a channel, preferably straight, passing right through the wall. The orifice or the cross section of the channel is generally circular and may have a diameter ranging from 0.1 to 10 mm, preferably 0.5 to 5 mm, for example 1 to 3 mm. The nozzle has especially orifices (or, in particular, channels passing through the wall of the nozzle) that are oriented in such a way that the resulting fractional streams are directed in a direction making, with the direction of the main stream flowing through the addition chamber, a right, acute or zero angle, preferably an acute or zero angle, that is to say in a direction having a non-zero component directed along the direction of the said stream. In particular, it is possible to choose a nozzle at least one of the orifices (or channels) of which is directed in such a way that the resulting fractional stream is oriented in a direction equivalent to the direction of the main stream flowing through the addition chamber or substantially in this direction, while at least one of the other orifices (or other channels) is directed in such a way that the resulting fractional stream is oriented in a direction making an angle of greater than 20° and less than or equal to 90°, preferably an angle of greater than 20° and less than 90°, for example an angle ranging from 30 to 80°, especially 45 to 75°, with the direction of the said main stream. The expression "direction substantially in the direction of the main stream" may be understood to mean a direction making an angle of ±20°, preferably ±10°, with the direction of the said stream. The orifices or channels oriented in a direction equivalent to the direction of the main stream or substantially in this direction may have a diameter the same as or different from that of the differently oriented orifices or channels: preferably, they may have a diameter greater, for example 1.2 to 4 times, preferably 1.5 to 3 times, greater than that of the differently oriented orifices or channels.

According to a preferred variant, the spray device is placed in the addition chamber which may have a constriction zone (or restriction or narrowing) so that the main stream undergoes a constriction as described above. The constriction zone may comprise, in the direction of flow of the main stream, in succession an upstream or convergent section and a downstream or divergent section, the narrowest part of the zone being located between the two sections. The spray device may be placed at any point in the constriction zone, for example in the upstream or convergent section or in the downstream or divergent section, or else in the narrowest part of the zone, that is to say located between the two sections. It has been noted that the best results are obtained when the spray device is located in the narrowest part of the constriction zone, or preferably in the downstream or divergent section of the zone. The plane of the divergent section may make an acute angle (A) or right angle, more specifically an angle of greater than 20° and less than or equal to 90°, preferably an angle of greater than 20° and less than 90°, for example an angle ranging from 30° to 80°, especially 45° to 75°, with the direction of the main stream flowing through the addition chamber, whereas the plane of the convergent section may make an obtuse angle (B) or right angle, more specifically an angle of greater than or equal to 90° and less than 160°, preferably an angle of greater than 90° and less than 160°, for example ranging from 100° to 150°, especially 105° to 135°, with the direction of the said main stream. The angles (A) and (B) are shown in particular in FIG. 3. The constriction zone may, for example, consist of an orifice plate or a "venturi" device. The narrowest part of the constriction zone may correspond to a large reduction in the area of the cross section for flow of the main stream in the addition chamber: the area may be reduced by a factor of at least 2, preferably at least 5, especially at least 10, for example by a factor ranging from 2 to 150, preferably 5 to 120, especially 10 to 80.

When the spray device is located in the narrowest part of the constriction zone or preferably in the downstream or divergent section of this zone, it is possible to choose a spray nozzle which has at least one of its orifices (or channels passing through the wall of the nozzle) directed in such a way that the resulting fractional stream is oriented in a direction parallel or approximately parallel to the plane of the downstream or divergent section. The expression "direction approximately parallel to the plane of the downstream or divergent section" may be understood to mean a direction making an angle of ±10°, preferably ±5°, with the plane of the said section. Furthermore, at least one of the other orifices (or other channels) may be directed in such a way that the resulting fractional stream is oriented in a direction equivalent to' the direction of the main stream flowing through the addition chamber or substantially in this direction. The expression "direction substantially in the direction of the main stream" may be understood to mean a direction making an angle of ±20°, preferably ±10°, with the direction of the said stream.

The apparatus according to the invention furthermore comprises a static mixer having an inlet and an outlet, and especially a longitudinal axis. The addition chamber is connected directly or indirectly to the static mixer. The addition chamber is preferably contiguous with (or adjacent to) the inlet of the static mixer and especially placed on the longitudinal axis of the static mixer. The static mixer may be a linear static mixer and be chosen from conventional static mixers, as described above, comprising especially static, possibly heating or cooling, mixing elements.

The apparatus according to the invention also includes an expansion chamber connected to the outlet of the static mixer. The expansion chamber may be chosen from the expansion chambers used in polymer degassing processes, such as the expansion chambers mentioned above. In general it is provided with an extrusion device for dividing the mixture leaving the static mixer, for example in the form of "falling strands". The function of the expansion chamber is to separate the polymer from the residual volatile compounds and from the foaming agent. It is provided with a line for extracting the residual volatile components and the foaming agent. The extraction line may leave the upper portion of the expansion chamber and be connected especially to a vacuum pump. The expansion chamber is also provided with a line for withdrawing the polymer melt thus stripped of the residual volatile compounds and of the foaming agent. The withdrawal line may be provided with a gear pump.

The present invention also relates to the use of the apparatus as described above in a process for degassing a thermoplastic polymer. The process may comprise the steps described above.

EXAMPLE 1

A high-impact polystyrene (HIPS), hereafter called "the polymer" was continuously degassed. The polymer was modified by grafting a polystyrene onto a polybutadiene and prepared by a continuous bulk polymerization process. The polymer contained 94.5% by weight of polystyrene and 5.5% by weight of polybutadiene. It had a weight-average molecular mass of 210 000 daltons and a residual styrene content of 1700 ppm.

Figure 1:
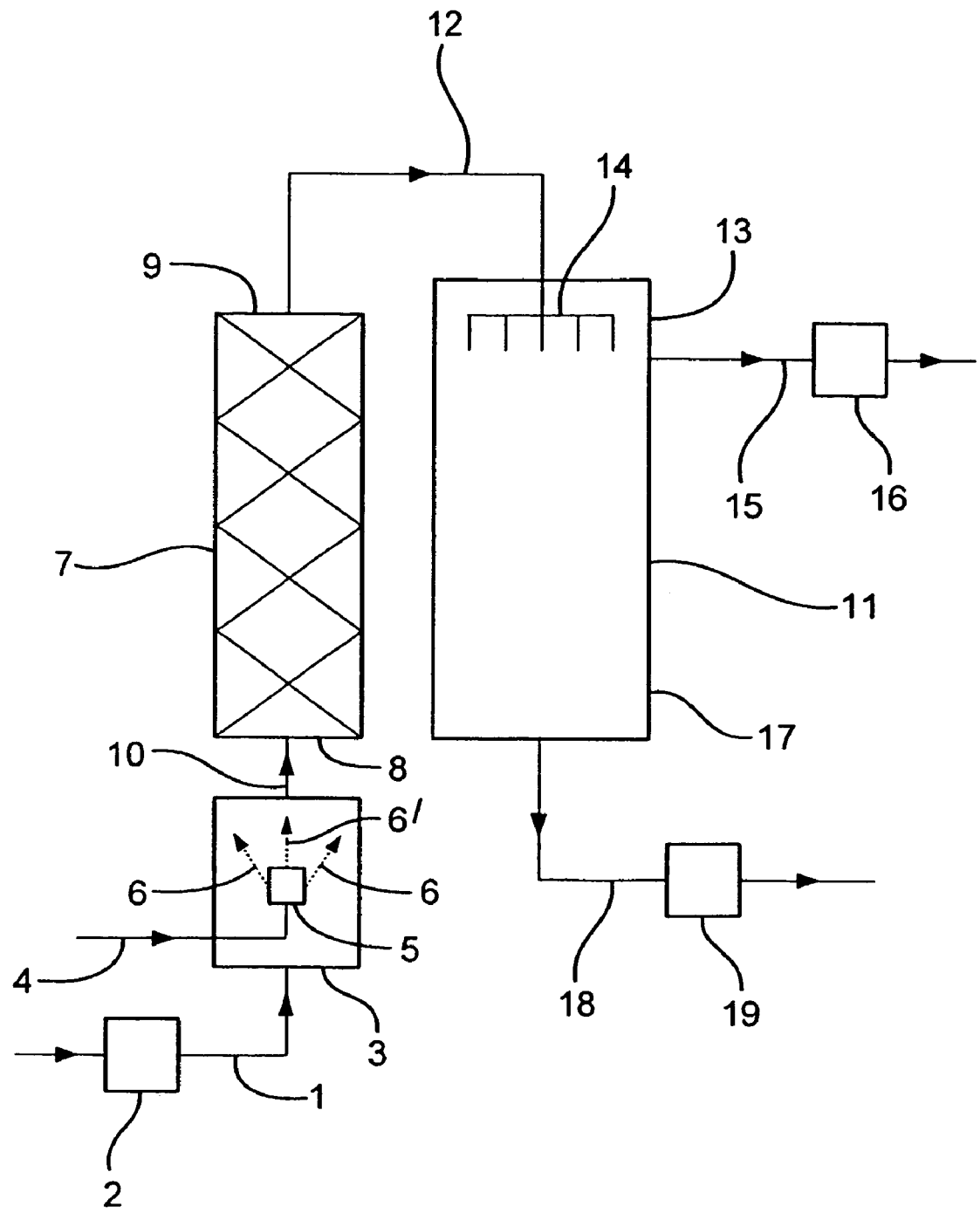
FIG. 1 shows schematically an apparatus for degassing a thermoplastic polymer allowing the process of the invention to be implemented. The apparatus comprises a polymer melt feed line (1) provided with a gear pump (2). The line (1) runs into an addition chamber (3) through which the polymer melt flows as a main stream. A line (4) for adding a foaming agent-flowing as a secondary liquid stream enters the chamber (3) and has, on the end of it, a spray device (5) for dividing the secondary liquid stream into several (in FIG. 1, into three) fractional streams (6) and (6'). The apparatus comprises a static mixer (7) having an inlet (8) and an outlet (9). The inlet (8) is connected to the addition chamber (3) via a line (10). The outlet (9) is connected to an expansion chamber (11) via a line (12), which line (12) enters the upper portion (13) of the expansion chamber and has, on the end of it, a means (14) for dividing and extruding the polymer melt/foaming agent mixture. The upper portion (13) of the expansion chamber is provided with a line (15) for extracting the residual volatile compounds and the foaming agent. The line (15) is connected to a vacuum pump (16). The lower portion (17) of the expansion chamber (11) is provided with a line (18) for withdrawing the polymer melt stripped of the residual volatile compounds and of the foaming agent. The line (18) is provided with a gear pump (19).
Figure 2:
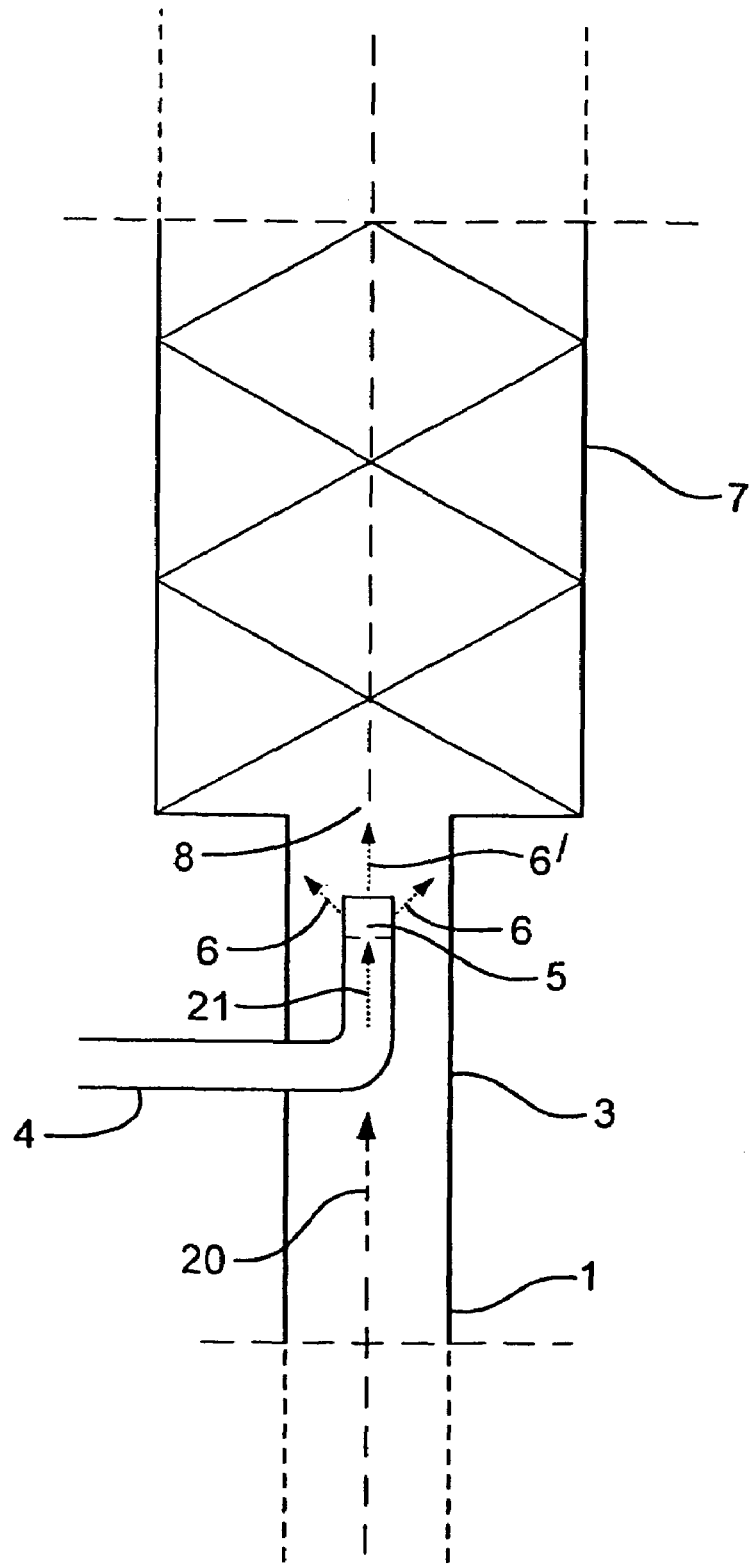
FIG. 2 shows schematically a first embodiment of a spray device that can be used in the apparatus shown in FIG. 1. The elements in FIG. 2 identical to those shown in FIG. 1 are identified by the same numerical references. A polymer melt feed line (1) runs into an addition chamber (3) through which the polymer melt flows as a main stream (20). The addition chamber (3) has the form of a line with the same cross section as the feed line (1) and placed in the continuation of the latter. A line (4) for adding a foaming agent flowing as a secondary liquid stream (21) has, on the end of it, a spray device (5) for dividing the secondary liquid stream (21) into several (in FIG. 2, into three) fractional streams (6) and (6'). The fractional stream (6') is oriented in a direction equivalent to the direction of the main stream (20), whereas the other two fractional streams (6) are oriented in a direction making an angle of 600 with the direction of the said main stream. The addition chamber (3) is connected directly to the inlet (8) of a static mixer (7), like that shown in FIG. 1.
Figure 3:
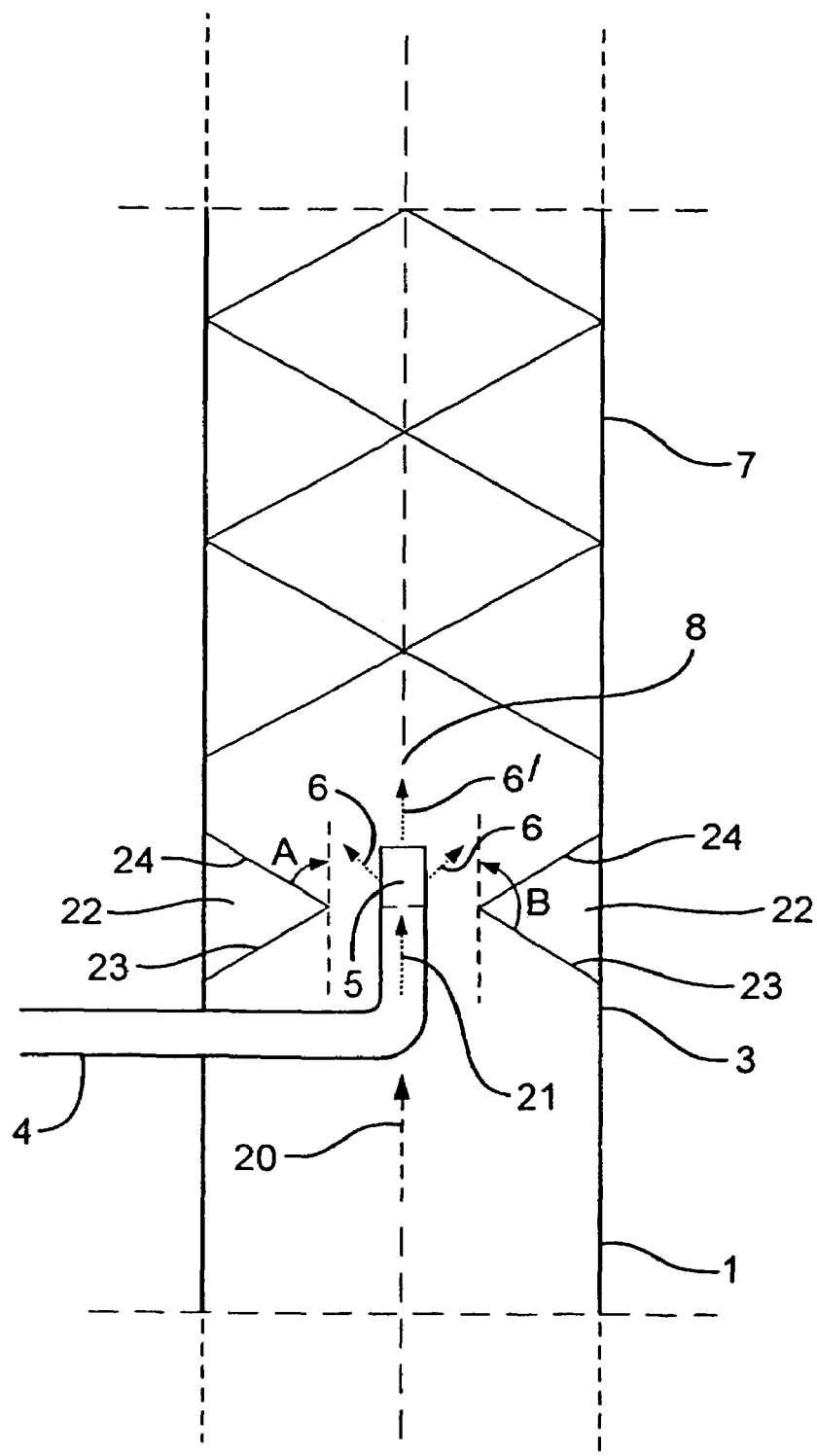
FIG. 3 shows schematically a second embodiment of a spray device that can be used in the apparatus shown in FIG. 1. The elements of FIG. 1 that are identical to those shown in FIG. 1 or 2 are identified by the same numerical references. The polymer melt feed line (1) runs into an addition chamber (3) through which the polymer melt flows as a main stream (20). A line (4) for adding a foaming agent flowing as a secondary liquid stream (21) enters the addition chamber (3). The line (4) has, on the end of it, a spray device (5) for dividing the secondary liquid stream (21) into several (in FIG. 3, into three) fractional streams (6) and (6'). The addition chamber (3) has a constriction (22) comprising an upstream or convergent section (23) and a downstream or divergent section (24). The plane of the upstream or convergent section and that of the downstream or divergent section make an angle (B) of 1200 and an angle (A) of 600 with the direction of the main stream (20), respectively. The spray device (5) is located in the downstream or divergent section (24) of the constriction. As a result, the fractional stream (6') from the spray device (5) is oriented in a direction equivalent (or parallel) to the direction of the main stream (20), whereas the other two fractional streams (6) are oriented in a direction parallel to the plane of the downstream or divergent section (24) of the constriction, that is to say in a direction making an angle of 60° with the direction of the said main stream. The addition chamber (3) runs directly into the inlet (8) of a static mixer (7), as shown in FIG. 1. The addition chamber (3) has the same cross section as the static mixer (7).
Figure 4:
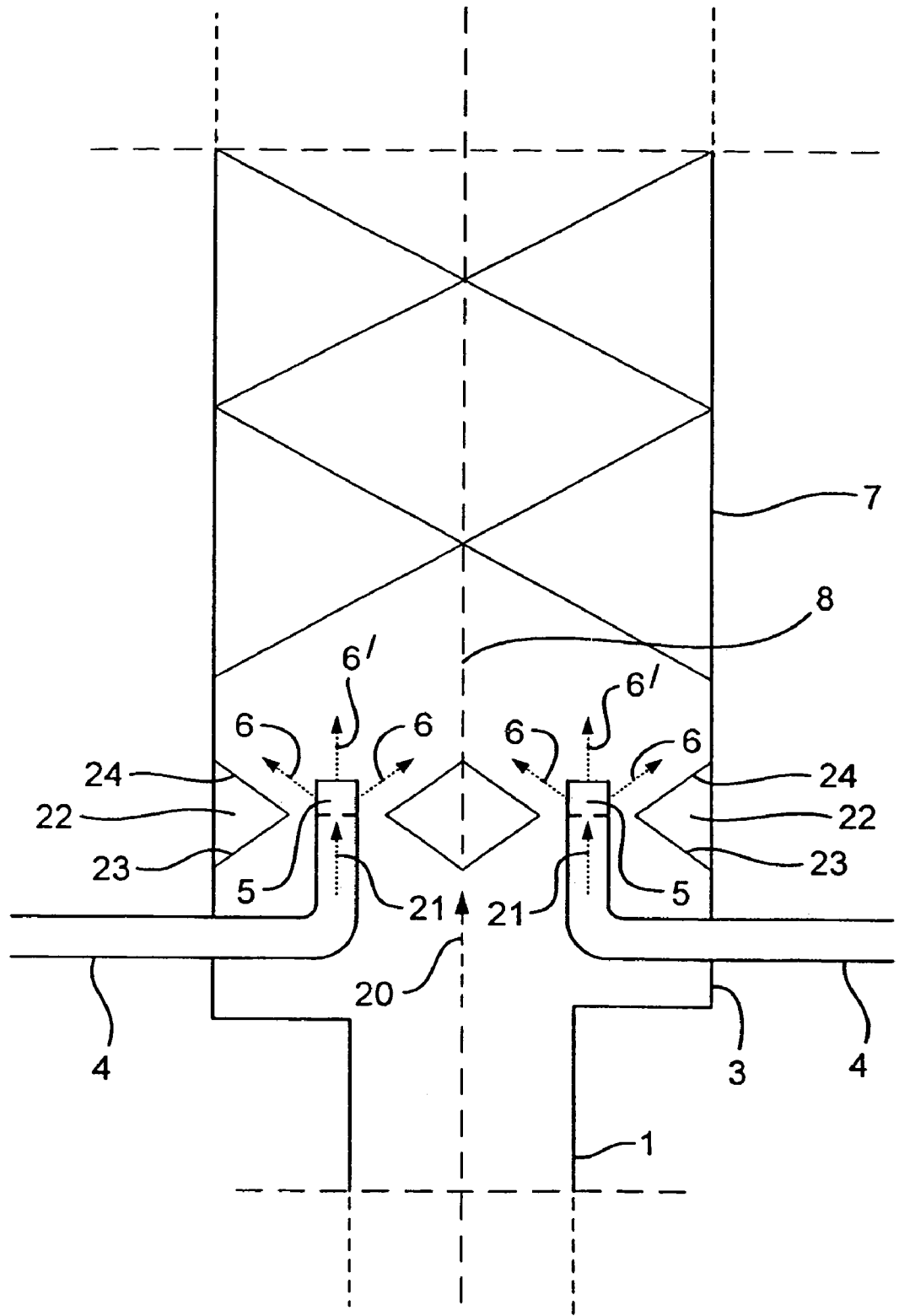
FIG. 4 shows schematically a third embodiment of a spray device which can be used in the apparatus shown in FIG. 1. The elements of FIG. 4 that are identical to those shown in FIG. 1, 2 or 3 are identified by the same numerical references. The device of FIG. 4 is identical to that shown in FIG. 3, except for the fact that it comprises two lines (4) for adding a foaming agent instead of one line. Thus, the foaming agent flows as two secondary liquid streams (21). Each line (4) has, on the end of it, a spray device (5) for dividing each secondary liquid stream (21) into several (in FIG. 4, into three) fractional streams (6) and (6'). The addition chamber (3) has a constriction (22) comprising an upstream or convergent section (23) and a downstream or divergent section (24). The plane of the upstream or convergent section (23) and that of the downstream or divergent section (24) make an angle (B) of 120° and an angle (A) of 600 (these angles not being shown in FIG. 4) with the direction of the main stream (20), respectively. The spray devices (5) are located in the downstream or divergent section (24) of the constriction. As a result, the fractional stream (6') from each spray device is oriented in a direction equivalent (or parallel) to the direction of the main stream (20), whereas the other two fractional streams (6) are oriented in a direction parallel to the plane of the downstream or divergent section (24) of the constriction, that is to say in a direction making an angle of 60° with the direction of the said main stream. The addition chamber (3) runs directly into the inlet (8) of the static mixer (7), as shown in FIG. 1. The addition chamber (3) has a cross section identical to that of the static mixer (7).
Figure 5:
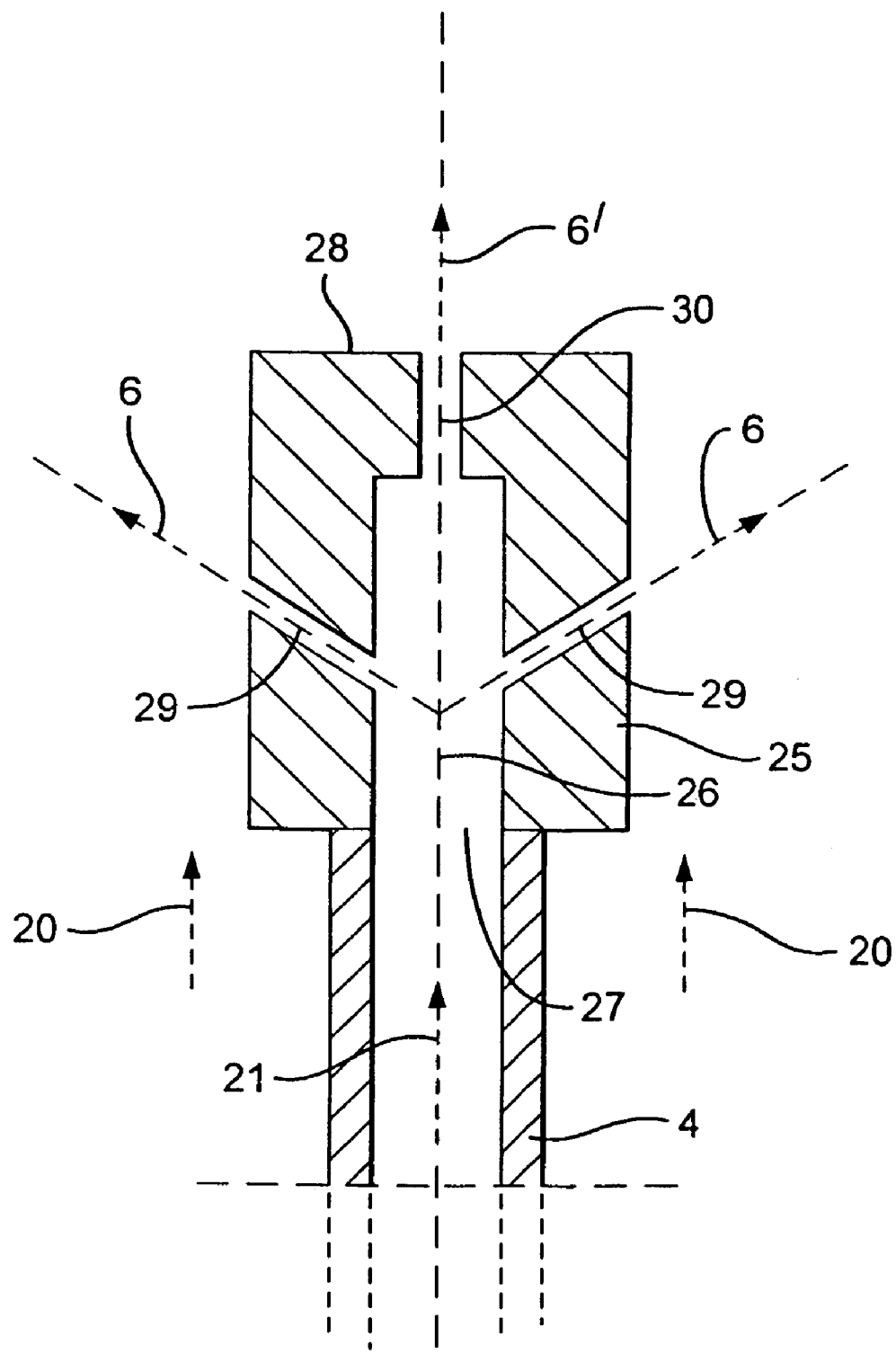
FIG. 5 shows schematically a spray nozzle that can be used in one of the devices shown in FIG. 2, 3 or 4. The elements of FIG. 5 that are identical to those shown in FIG. 2, 3 or 4 are identified by the same numerical references. A line (4) for adding a foaming agent flowing as a secondary liquid stream (21) enters an addition chamber (3) (not shown in FIG. 5) through which a polymer melt flows as a main stream (20). The line (4) is provided, on the end of it, with a spray device (5) forming a nozzle having the shape of a cylindrical hollow plug having one base closed and the other open and contiguous with the end of the line (4). The nozzle is more particularly formed by a cylindrical envelope (25) having an axis of revolution (26) parallel to the main stream (20), an open base (27) contiguous with the end of the line (4) and a closed base (28). The cylindrical envelope (25) and the closed base (28) are pierced by two cylindrical channels (29) and by a cylindrical channel (30), respectively, in such a way that the secondary liquid stream (21) is divided into several (in FIG. 5, into three) fractional streams (6) and (6'). The cylindrical channels (29) are oriented in such a way that their axis (coincident with the direction of the fractional streams)) makes an angle of 600 with the direction of the main stream (20). The cylindrical channel (30) is oriented in such a way that its axis (coincident with the direction of the fractional stream (6')) is identical (or parallel) to the direction of the main stream (20). The following examples illustrate the present invention.

The degassing was carried out continuously in an apparatus as shown in FIG. 1. The polymer was used in the form of a melt flowing continuously as a main stream with a flow rate of 7000 kg/h, at a temperature of 238° C. and an absolute pressure of 2.5 MPa, in a feed line (1) provided with a gear pump (2). The polymer melt fed an addition chamber (3) through which the polymer melt flew as a main stream (20). Two water addition lines (4), as shown in FIG. 4, entered the addition chamber (3), in which lines water heated to 150° C. and at an absolute pressure of 3.5 MPa flew as two secondary liquid streams (21). Each line (4) was provided, at the end of it, with a spray device (5) identical to that shown in FIG. 5, except for the fact that the number of cylindrical channels (29) was 4 instead of 2. Thus, the nozzle (5) forming the spray device was pierced by four cylindrical channels (29) 1 mm in diameter and by a cylindrical channel (30) 2 mm in diameter, having directions and making angles as shown in FIG. 5. It followed that each secondary liquid stream (21) was divided into five fractional streams (6) and (6'). The total head loss created by the spray device was 0.5 MPa. The water flew continuously via the two lines (4) and the spray devices (5) into the addition chamber (3), in a total amount equivalent to 1.5% by weight with respect to the polymer. The addition chamber (3) had a constriction zone (22), as shown in FIG. 4, having a convergent section (23) and a divergent section (24) making an angle (B) of 1200 and an angle (A) of 600 with the direction of the main stream (20), respectively.

The pre-mixture, resulting from the addition of water to the polymer melt, then flew continuously directly into the inlet (8) of a static mixer (7) of the SMX® type sold by Koch Glitsch (Switzerland), at a temperature of 235° C. and at an absolute pressure of 2.5 MPa. The mean residence time of the polymer/water mixture in the static mixer (7) was 3 minutes. A polymer melt/water mixture at a temperature of 230° C. and at an absolute pressure of $3.5 \times 10^3$ Pa was obtained at the outlet (9) of the static mixer (7).

The mixture was then introduced continuously into an expansion chamber (11) via a line (12), which line entered the said chamber and had, on the end of it, an extrusion and dividing means (14) placed in the upper portion (13) of the expansion chamber (11). The expansion chamber (11) was heated to a temperature of 225° C., at an absolute pressure of $3.5 \times 10^3$ Pa. The residual volatile compounds, such as the residual styrene, and the water were separated from the polymer melt and withdrawn continuously from the expansion chlamber (11) via an extraction line (15) connected to a vacuum pump (16). The polymer melt, thus stripped of the residual volatile compounds and of the water, was continuously withdrawn at 235° C. from the expansion chamber (11) via a withdrawal line (18) provided with a gear pump (19). The residual styrene content of the polymer thus withdrawn was 150 ppm.

EXAMPLE 2

Comparative Example

Here the process was exactly as in Example 1, except that the water was introduced into the addition chamber (3) via the addition lines (4) that did not have the spray device (5) on the end of them.

Under these conditions, "pounding", in particular "hammering", phenomena were observed throughout the static mixer (7) and right into the expansion chamber (11). Moreover, the polymer withdrawn via the withdrawal line (18) had a residual styrene content of 250 ppm. These "pounding" phenomena put the degassing plant into jeopardy, so that the degassing process had to be quickly stopped for safety reasons.

The invention claimed is:

1. A process for removing residual volatile compounds contained in a thermoplastic polymer comprising the following steps:
   (1) forming a thermoplastic polymer containing residual volatile compounds in the form of a melt flowing as a main stream;
   (2) forming a foaming agent in the form of one or more secondary liquid streams;
   (3) adding the one or more secondary liquid streams to the main stream by spraying so as to divide each secondary liquid stream into several fractional streams and form a polymer melt/foaming agent pre-mixture;
   (4) introducing the pre-mixture into a static mixer, then into an expansion chamber at reduced pressure so as to separate the polymer melt from the residual volatile compounds and from the foaming agent; and
   (5) withdrawing the polymer melt, separated from the residual volatile compounds and the foaming agent, from the expansion chamber.

2. The process according to claim 1, wherein the thermoplastic polymer is chosen from olefin polymers and aromatic vinyl polymers.

3. The process according to claim 1 or 2, wherein the foaming agent is chosen from water, alcohols, ketones, an aqueous carbon dioxide solution, and mixtures of two or more of these agents.

4. The process according to claim 1, wherein each secondary liquid stream is divided, by spraying, into at least two fractional streams.

5. The process according to claim 1, wherein each fractional stream is oriented in a direction making a right, acute or zero angle with respect to the direction of the main stream.

6. The process according to claim 1, wherein at least one fractional stream is oriented in a direction substantially equivalent to the direction of the main stream, while at least one other fractional stream is oriented in a direction making an angle of greater than 20° and less than or equal to 90° to the direction of the main stream.

7. The process according to claim 1, wherein each secondary liquid stream is added to the main stream at the moment when the main stream is subjected to a constriction that comprises, in succession in the direction of flow of the main stream, a decompression phase followed by a compression phase.

8. The process according to claim 7, wherein each secondary liquid stream is added to the main stream between the decompression phase and the compression phase.

9. An apparatus for removing residual volatile compounds contained in a thermoplastic polymer, comprising:
   a thermoplastic polymer melt feed line;
   an addition chamber into which the feed line runs and through which a thermoplastic polymer melt containing residual volatile compounds flows as a main stream;
   one or more lines for the addition of a foaming agent flowing as one or more secondary liquid streams, which lines run into the addition chamber and have at their ends a spray device allowing each secondary liquid stream to be divided into several fractional streams;

a static mixer having an inlet, connected to the addition chamber, and an outlet; and an expansion chamber for separating the polymer melt from the residual volatile compounds and from the foaming agent, which chamber is connected to the outlet of the static mixer and is provided with a line for withdrawing the polymer melt thus separated and with a line for extracting the residual volatile compounds and the foaming agent.

10. The apparatus according to claim 9, wherein the spray device includes a closed nozzle placed on the end of the addition line and pierced by several orifices, the number of which is equivalent to the number of fractional streams to be formed by the spray device.

11. The apparatus according to claim 10, wherein the number of orifices per nozzle is at least 2.

12. The apparatus according to claim 10 or 11, wherein the orifices are oriented in such a way that the resulting fractional streams are directed along a direction making a right, acute or zero angle, with respect to the direction of the main stream flowing through the addition chamber.

13. The apparatus according to claim 10 wherein at least one of the orifices is directed in such a way that the resulting fractional stream is oriented in a direction substantially equivalent to the direction of the mainstream flowing through the addition chamber, while at least one other orifices is directed in such a way that the resulting fractional stream is oriented in a direction making an angle of greater than 20° and less than or equal to 90° to the direction of the main stream.

14. The apparatus according to claim 9, wherein the addition chamber comprises a constriction zone having, in the direction of flow of the main stream, in succession an upstream or convergent section and a downstream or divergent section, the narrowest part of the constriction zone being located between the two sections.

15. The apparatus according to claim 14, the wherein the spray device is placed in the narrowest part of the constriction zone.

16. The apparatus according to claim 9, wherein the addition chamber is contiguous with the inlet of the static mixer.

17. The process of claim 2, wherein the thermoplastic polymer is a styrene (co-)polymer.

18. The process of claim 3, wherein the alcohols are $C_1$ to $C_{10}$ alcohols and the ketones are $C_3$ to $C_{10}$ ketones.

19. The process of claim 4, wherein each secondary liquid stream is divided into at least three fractional streams.

20. The process of claim 19, wherein each secondary liquid stream is divided into at least four fractional streams.

21. The process of claim 5, wherein each fractional stream is oriented in a direction making an acute or zero angle with respect to the direction of the main stream.

22. The process of claim 6, wherein the angle is greater than 20° and less than 90°.

23. The process of claim 22, wherein the angle is from 30° to 80°.

24. The process of claim 7, wherein each secondary liquid stream is added to the main stream while the main stream is in the compression phase.

25. The apparatus of claim 11, wherein the number of orifices per nozzle is at least 3.

26. The apparatus of claim 25, wherein the number of orifices per nozzle is at least 4.

27. The apparatus of claim 12, wherein the orifices are oriented in a direction making an acute or zero angle with respect to the direction of the main stream flowing through the addition chamber.

28. The apparatus of claim 13, wherein the angle is greater than 20° and less than 90°.

29. The apparatus of claim 28, wherein the angle is from 30° to 80°.

30. The apparatus of claim 14, wherein the spray device is placed in the downstream or divergent section of the constriction zone.

* * * * *